United States Patent [19]

Madni et al.

[11] Patent Number: 5,734,593
[45] Date of Patent: Mar. 31, 1998

[54] FUZZY LOGIC CONTROLLED CRYOGENIC COOLER

[75] Inventors: Asad M. Madni, Los Angeles; Lawrence A. Wan, Malibu; Jim Bi Vuong, Northridge, all of Calif.

[73] Assignee: BEI Sensors & Systems Company, Inc., Sylmar, Calif.

[21] Appl. No.: 639,122

[22] Filed: Apr. 24, 1996

[51] Int. Cl.⁶ .................................................. F25B 7/00
[52] U.S. Cl. .................... 364/557; 395/61; 395/76; 236/38 B; 62/112
[58] Field of Search ............... 395/900, 61, 3, 395/54; 364/557, 148; 62/117, 175, 6; 236/78 D, 78 B; 165/211, 12

[56] References Cited

U.S. PATENT DOCUMENTS

| | | | |
|---|---|---|---|
| 5,347,615 | 9/1994 | Yamakawa et al. | 395/76 |
| 5,440,891 | 8/1995 | Hindmon, Jr. et al. | 62/117 |
| 5,491,775 | 2/1996 | Madau et al. | 315/3 |

Primary Examiner—Emanuel T. Voeltz
Assistant Examiner—Kamini S. Shah
Attorney, Agent, or Firm—Flehr Hohbach Test Albritton & Herbert

[57] ABSTRACT

A fuzzy logic controller for a cryogenic system in which, for example, a cold tip cooling an infrared detector uses a Stirling cycle cooler-compressor with the helium coolant maintained at typically 78° K. This temperature is maintained by a fuzzy logic controller which has as its inputs the temperature differential between the desired temperature and actual cold tip temperature, rate of change of such temperature, and especially for startup the difference between a maximum voltage which can be applied to the Stirling type cooler-compressor and the actual control voltage which is applied. Appropriate membership functions for all of the inputs are provided of the triangular type. And appropriate rules related to the operation of a Stirling cycle cooler provide for fuzzy outputs which with an output membership function are defuzzified to provide a control output signal which controls the final cooling power of the cooler-compressor.

11 Claims, 6 Drawing Sheets

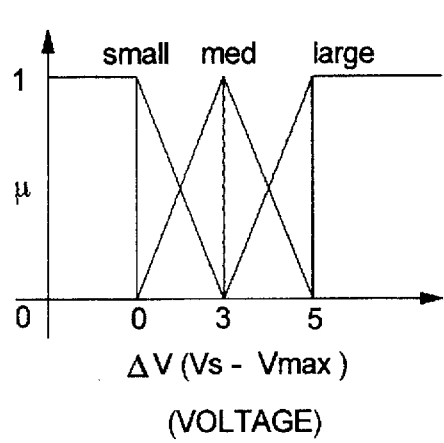
FIG.7A
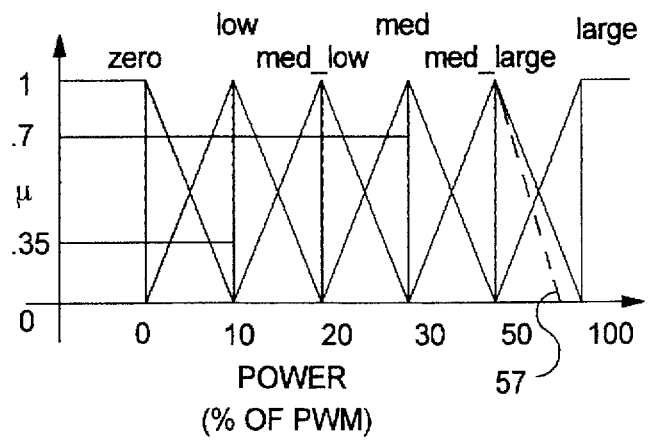
FIG.8
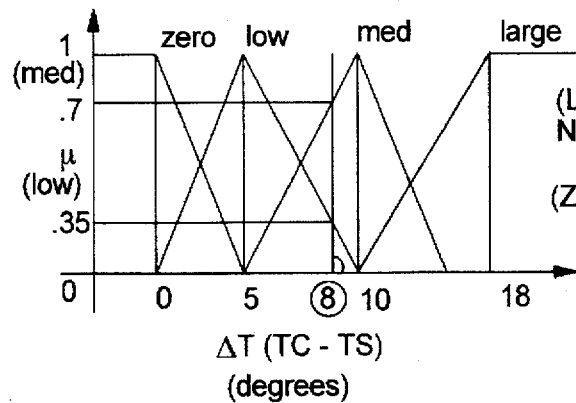
FIG.7B
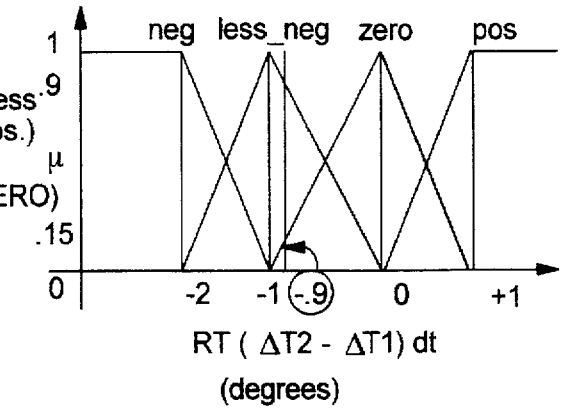
FIG.7C
| RULE | ΔT | RT | POWER | | RULE EVALUATION |
|------|------|------|---------------|---|----------------------|
| 5 | 0.7 | 0.9 | 30% = 0.7 × 30% | } | output of rules 5 and 6 |
| 6 | 0.7 | 0.15 | 30% = 0.15 × 30% | | = 0.7 × 30% |
| 9 | 0.35 | 0.9 | 10% = 0.35 × 10% | } | output of rules 9 and 10 |
| 10 | 0.35 | 0.15 | 10% = 0.15 × 10% | | = 0.35 × 10% |
$$\text{POWER} = \frac{0.7 \times .30 + 0.35 \times 10}{0.7 + 0.35} = 23.33\% \text{ of PWM}$$
FIG.10

1. IF ΔT IS LARGE AND ΔV IS LARGE THEN POWER IS MEDIUM.
2. IF ΔT IS LARGE AND ΔV IS MEDIUM THEN POWER IS MEDIUM_LARGE.
3. IF ΔT IS LARGE AND ΔV IS SMALL THEN POWER IS LARGE.
4. IF ΔT IS MEDIUM AND RT IS NEGATIVE THEN POWER IS MEDIUM_LARGE.
5. IF ΔT IS MEDIUM AND RT IS LESS_NEGATIVE THEN POWER IS MEDIUM.
6. IF ΔT IS MEDIUM AND RT IS ZERO THEN POWER IS MEDIUM.
7. IF ΔT IS MEDIUM AND RT IS POSITIVE THEN POWER IS MEDIUM_LARGE.
8. IF ΔT IS MEDIUM AND & RT IS NEGATIVE THEN POWER IS MEDIUM_LOW.
9. IF ΔT IS LOW AND RT IS LESS_NEGATIVE THEN POWER IS LOW.
10. IF ΔT IS LOW AND RT IS ZERO THEN POWER IS LOW.
11. IF ΔT IS LOW AND RT IS POSITIVE THEN POWER IS MEDIUM_LOW.
12. IF ΔT IS LOW AND RT IS NEGATIVE THEN POWER IS LOW.
13. IF ΔT IS ZERO AND RT IS LESS_NEGATIVE THEN POWER IS ZERO.
14. IF ΔT IS ZERO AND RT IS ZERO THEN POWER IS ZERO.
15. IF ΔT IS ZERO AND RT IS POSITIVE THEN POWER IS MEDIUM_LOW.

FIG.9

FUZZY LOGIC CONTROLLED CRYOGENIC COOLER

The present invention is directed to a fuzzy logic controlled cryogenic cooler and more particularly where helium gas is circulated in a cold tip for cooling an infrared detector.

BACKGROUND OF THE INVENTION

Cryogenic refrigerators have been used since the 1960's for infrared detector cooling in tactical systems used by the United States Army's Night Vision Laboratory. These coolers include a so-called cold tip which is in close proximity to the infrared detector. These devices known as cryocoolers are based on Stirling thermodynamics utilizing an engine with sliding surface bearings and seals. In such a Stirling cycle refrigerator, a pair of opposed pistons, the expander piston and the compressor piston are used with a pair of heat exchangers to achieve isothermal compression and expansion of the fluid (liquid nitrogen normally). Such cylinders operate at relatively high velocities because the associated pistons have a small area. Because of such severe operating conditions, mean time to failure (MTTF) has been unsatisfactory.

Normally because a temperature-entropy diagram would be required for each unit of mass in the system, such a system is usually analyzed by means of a pressure volume diagram. In the past, the performance of such Stirling cycle refrigerators were simulated by the aid of a digital computer in order to achieve prediction with greater accuracy of such performance. However, this had to be tailored to the specific embodiment but was unworkable and expensive for a mass produced unit. Also MTTF was still unsatisfactory.

OBJECT AND SUMMARY OF THE INVENTION

It is an object of the present invention to provide a fuzzy logic controlled cryogenic system.

In accordance with the above object, a cryogenic cooling system is provided where a Stirling cycle cooler-compressor is used for circulating a coolant fluid to a cold tip which is in proximity to the device for which cooling is desired, the cooler-compressor cooling the fluid to a predetermined temperature. Ambient temperature is sensed. The actual temperature of the circulating fluid is sensed and the rate of change of the actual temperature. Controller means are responsive to inputs of the difference between the predetermined and actual temperature and the rate of change temperature for providing an output control signal to the cooler-compressor to substantially maintain the predetermined temperature. It includes digital logic means for providing first and second input membership functions respectively related to the inputs, the membership functions being formed by mathematically fuzzy sets. The digital logic means also determines the degree of membership of the inputs to the respective input membership functions. The digital logic means also stores a set of rules which take into account the heat transfer characteristics of the cryogenic system.

Finally, the digital logic means also provides an output membership function from which may be selected an output signal, the controller means selecting only rules relevant to the inputs having a degree of membership with the input membership functions and also using the output membership function for finding a weighted average which is the output control signal.

BRIEF DESCRIPTION OF THE DRAWINGS

FIGS. 7A, 7B and 7C are input membership function diagrams illustrating a step of FIG. 6.

FIG. 8 is an output membership function illustrating a step of FIG. 6.

FIG. 9 is a set of rules used in a step of FIG. 4.

FIG. 10 is a table indicating by example the application of the functions of FIGS. 7A–7C and the rules of FIG. 9 for providing a crisp output.

DETAILED DESCRIPTION OF PREFERRED EMBODIMENTS

Figure 1:
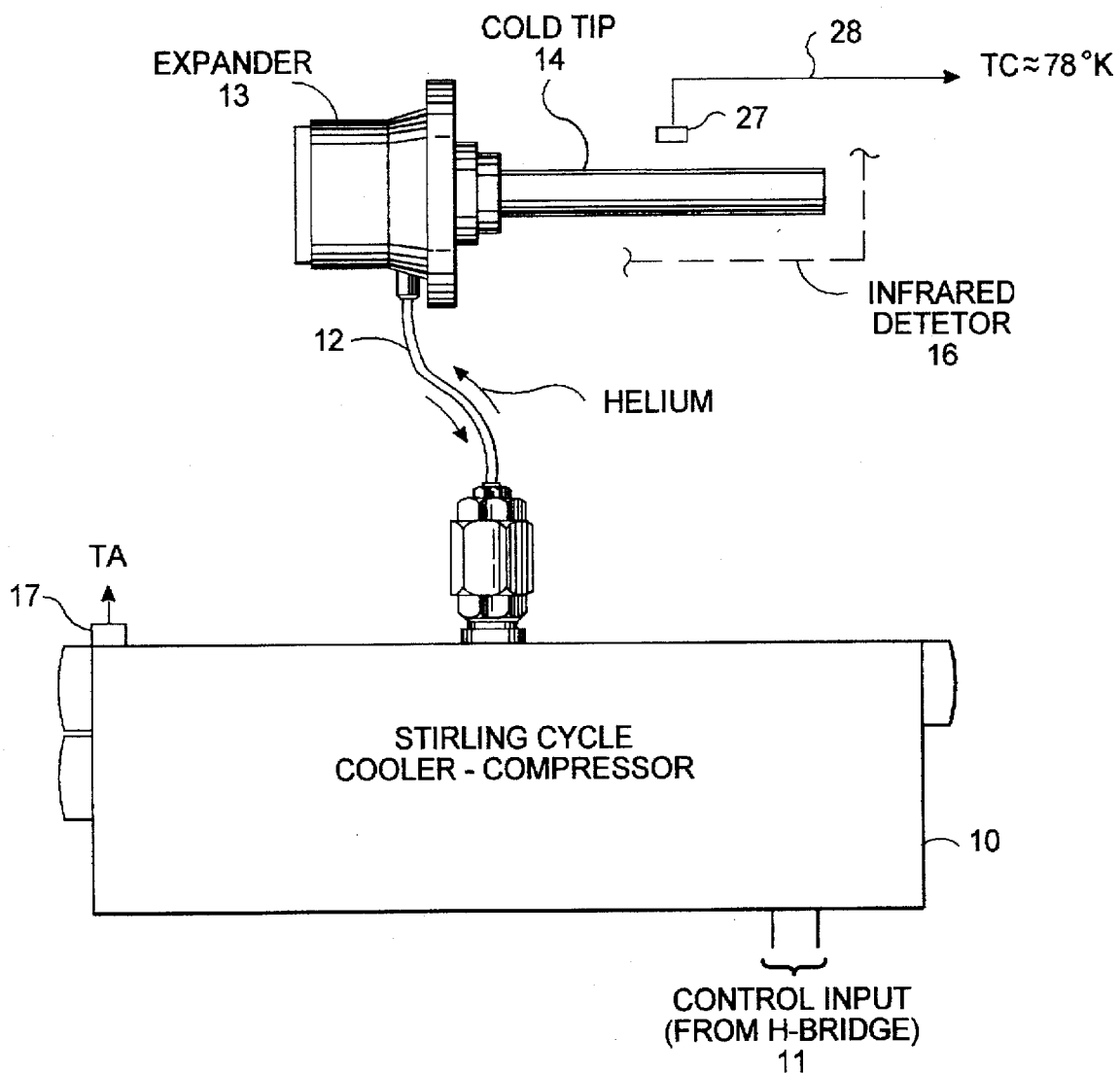
FIG. 1 is a block diagram of the hardware components of the present invention including a cooler-compressor and a cold tip.

FIG. 1 illustrates a Stirling cycle cooler which includes a Stirling cycle cooler-compressor 10 whose pistons are driven by a control input 11 from an H-bridge as will be discussed in conjunction with FIG. 2. The cooler-compressor is connected by a coupling 12 which is the path for the helium gas coolant in both directions as shown by the arrows to an expander 13 where it provides for the cooling of a cold tip 14. The cold tip is placed in proximity to the infrared detector 16 or for that matter any other device for which cryocooling is desired. As thus far described, the apparatus of FIG. 1 is commercially available, for example, as Model B500C from BEI Electronics, Inc. However, in accordance with the invention the control input 11 is provided by an intelligent microcontroller unit illustrated in FIG. 2 which includes a fuzzy logic controller 31; in addition, the system includes in accordance with the present invention an ambient air temperature sensor 17 to provide an ambient temperature, TA, and also a cold tip temperature sensor 27 at the cold tip 14 indicated to provide a cold tip temperature, TC, on line 28. The desired nominal and predetermined temperature of the cold tip is indicated as 78° K. The present invention has the ability to vary such temperature.

Figure 2:
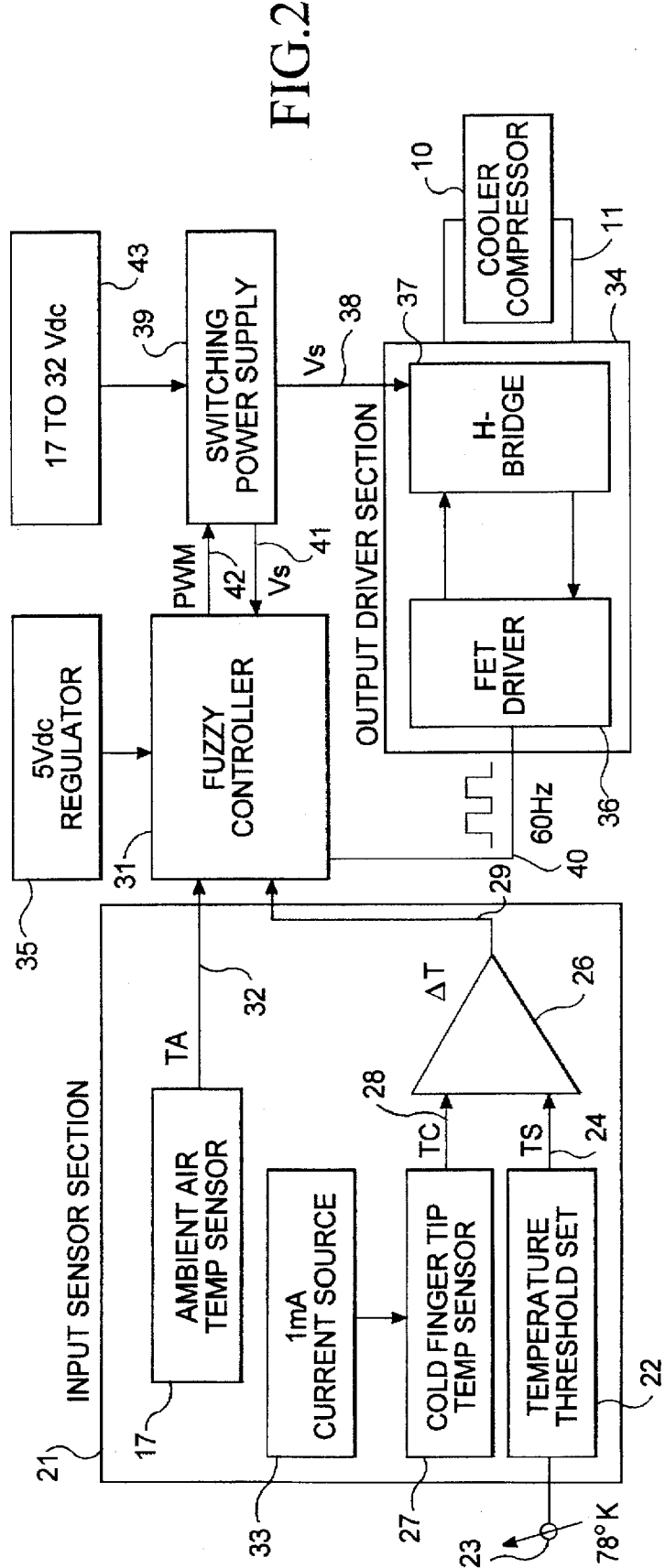
FIG. 2 is an overall simplified block diagram of the fuzzy logic based controller used for controlling the power applied to the cooler compressor of FIG. 1.

FIG. 2 illustrates this where in the input sensor section 21 of the overall microcontroller unit a temperature threshold set unit 22 has a variable input 23 to provide the set point or predetermined temperature, TS, on the line 24 to the comparator 26. Then, the cold tip temperature sensor 27 is indicated having on line 28 the cold tip temperature, TC. These two are compared and their difference is on the ΔT output 29 of the comparator 28 which is an input to the fuzzy controller 31. Also the ambient air temperature sensor 17 provides on line 32 the temperature, TA, which is also inputted to the fuzzy controller 31. A one milliampere current source 33 feeds the cold tip temperature sensor 27. Ambient temperature, TA, is the environmental temperature of the cooler-compressor 10.

Fuzzy controller 31 is powered by a regulated 5 Vdc voltage source 35. An output driver section 34 includes a field effect transistor (FET) driver 36 and an H-bridge 37 which drives the cooler-compressor 10 on its inputs 11 (see FIG. 1). A 60 Hz input 40 is a driving pulse to alternate the drive current from H-bridge 37 to the pair of actuator coils (not shown) for the cooler-compressor 10 to operate its two pistons (see discussion above). A variable DC voltage, $V_s$, is supplied by input 38 from a switching power supply 39 to H-bridge 37. The magnitude of the drive current and thus the cooling power is determined by the magnitude of $V_s$. This voltage, $V_s$, is also supplied on line 41 of a feedback basis to fuzzy controller 31 for control purposes, and also to ensure that it does not exceed the maximum voltage, $V_{max}$, for the cooler-compressor. Switching power supply 39 is driven by a pulse width modulated (PWM) signal on line 42 from fuzzy controller 31 which has a rate of at least 100 KHz to control the magnitude of $V_s$ which is derived from a 17 to 32 Vdc source 43. The upper range of DC voltage, $V_s$, varies from 0 volt DC to +15 Vdc and is limited at a +17 Vdc based on the performance of the cooler-compressor. This is illustrated by a characteristic of a controller, as shown by the equation in FIG. 4. The maximum voltage is adjusted according to ambient temperature, TA. Thus, at −40°C., it is 14 volts and at +85° C. it is 17 volts.

Figure 5:
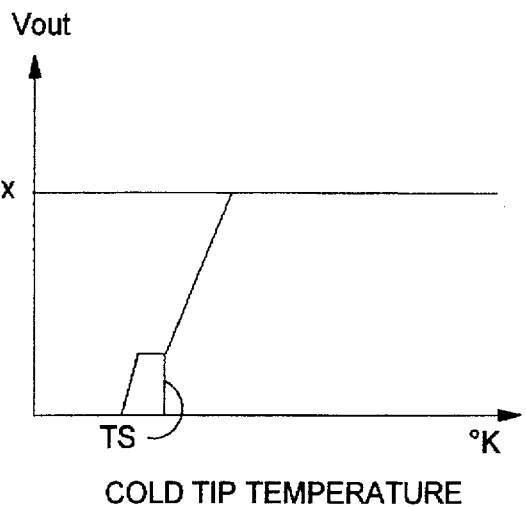

FIG. 5 is the characteristic of the cold tip temperature, TS, in relation to applied voltage and maximum voltage.

Figure 3:
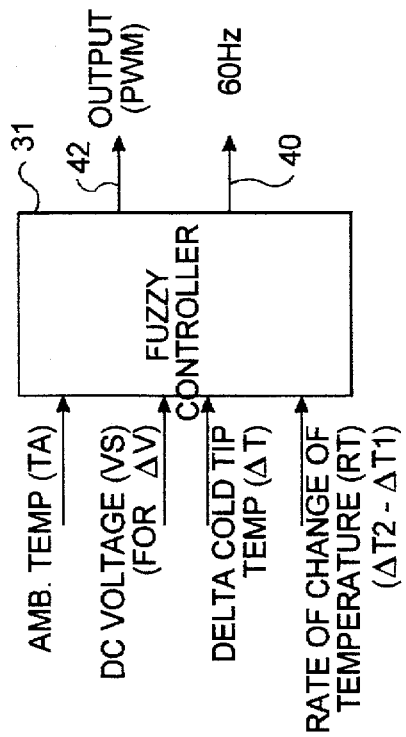
FIG. 3 is a simplified block diagram of a portion of FIG. 2 showing the inputs and outputs of the fuzzy controller of FIG. 2.

FIG. 3 summarizes the various inputs of the fuzzy logic controller 31 which also includes a rate of change of temperature, RT, which is ΔT2−ΔT1. ΔT1 is the last temperature difference measured, and the ΔT2 is the temperature difference now. This is derived by digital logic within fuzzy controller 31. The two outputs of fuzzy controller 31 are the PWM output 42 which determines the final cooling power applied to cooler compressor 10 and, of course, the switching directional command on line 40.

Figure 4:
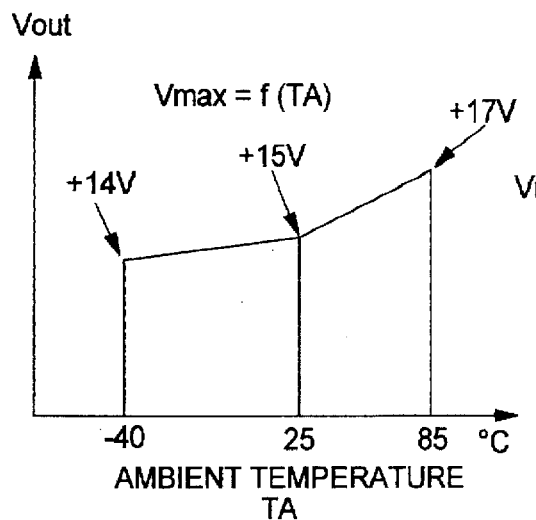
FIGS. 4 and 5 are characteristics of the controller of FIG. 3.

Yet another effective input fuzzy controller 31 is ΔV which is the difference between $V_s$ and $V_{max}$ which the fuzzy controller itself derives by use of the characteristic of FIG. 4.

Figure 6:
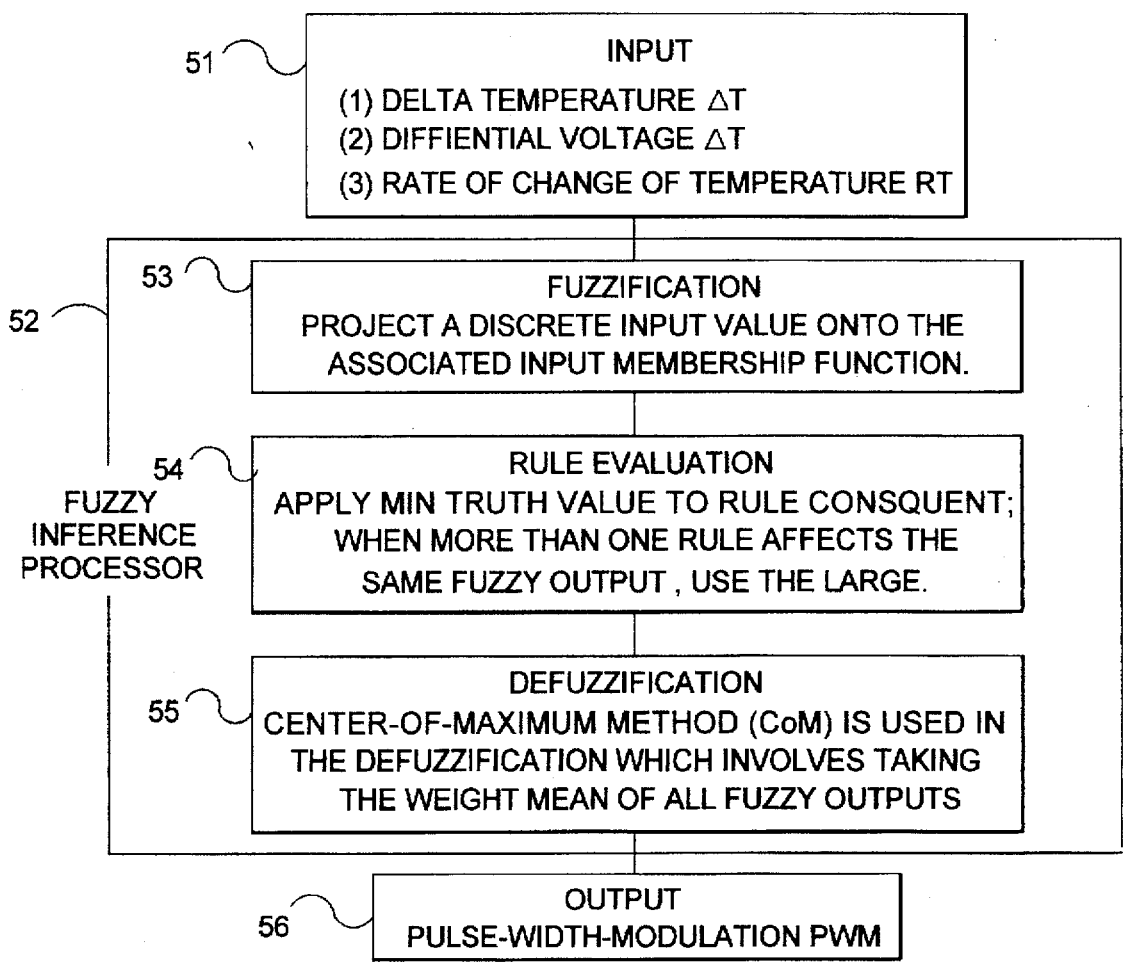
FIG. 6 is a fuzzy logic flow diagram illustrating in broad terms the operation of the present invention.

Now referring to the flow diagram of FIG. 6, as indicated in the input step 51, the fuzzy logic controller of the present invention is indicated as having the three inputs ΔT, ΔV and RT. Of course, the ambient temperature, TA, has been used to compute ΔV. Fuzzy inference processing, as indicated in the block 52, is accomplished in three steps; that is, step 53 Fuzzification, step 54 Rule Evaluation and step 55 Defuzzification. And then the PWM output is indicated as step 56.

Before describing the fuzzy logic technique of the present invention in detail, it should be initially stated, the phrase "fuzzy logic" is actually a misnomer. There is nothing fuzzy about it and a better name would be "multi-valued logic". It is related to mathematical fuzzy set theory, developed by Lofti Zadeh, at the University of California, Berkeley, Calif. The terms to be used below are well known in the fuzzy logic field.

Briefly in step 53, the fuzzification step, the input variables, the three inputs listed in step 51, are assigned degrees of membership in various membership functions or classes. Thus, referring briefly to FIG. 7A, ΔV is assigned membership in the triangular fuzzy sets of small, medium and large; FIG. 7B, ΔT is assigned membership in zero, low, medium or large. This membership function is also overlapping triangles. Then, finally RT, FIG. 7C, is assigned to fuzzy sets of negative, less negative, zero and positive.

FIG. 7B is, of course, the crucial input membership function since it is desired to bring the measured cold tip temperature, TC, as close as possible to the predetermined or desired temperature or set point temperature, TS; and this is where ΔT would equal zero.

Thus, FIGS. 7A, 7B and 7C are the three input membership functions of the present invention with the horizontal axis being the input variable and the vertical axis indicating the degree of membership ranging from zero to one. As illustrated, all the membership functions have fuzzy sets which are triangularly shaped and overlap. However, other shapes such as trapezoidal, or even singletons, may be used if desired for a particular application.

FIG. 8 is the output membership function of the present invention where the horizontal axis is % of PWM or the effective cooling power of the cooler-compressor and also includes overlapping triangular fuzzy sets designated zero, low, medium low, medium, medium large and large. Although the triangles are shown as symmetrical, depending on the resolution and the characteristics of a particular kind of Stirling cycle cooler-compressor, it may be desired to have an asymmetrical output membership function as, for example, indicated by the dashed line 57.

Referring back to FIG. 6, in the defuzzification step it is stated that a center of maximum method is used which involves taking the weight mean of all fuzzy outputs. In practice, as illustrated in FIG. 8 with a symmetrical triangular output function, such center of maximum method, as will be described by example, effectively provides singleton fuzzy sets, that is, each fuzzy set has only one value in it; namely, zero, low, medium low, medium, medium large and large.

Finally, referring to the Rule Evaluation step of 54, all of the inputs are applied to a set of rules (see FIG. 9) as related to the input membership functions of FIG. 7A, 7B and 7C, and these generate a set of fuzzy outputs. This is done, as will be discussed below, with well known steps in fuzzy logic theory.

FIG. 9 illustrates the 15 rules by which rule evaluation is made with various inputs and membership functions as outlined in step 54 of FIG. 6. These rules are intuitively derived from the known thermodynamic or heat transfer characteristics of the cryogenic system. Thus the crucial rules, in order to produce the predetermined TS, are rules 4 through 15. In rule 13, since ΔT is zero, the predetermined temperature has been substantially reached, and here the power supplied is, of course, low. All that must be done to compensate for the steady state losses of the system. Then, of course, as the ΔT increases to a low value, cooling power may be raised to a medium low value such as in steps 11 and 15.

Where the ΔT is medium as shown in steps 4 through 8, there is not a significant difference, for example, 5° to 12° from the desired temperature setting. Here, these steps could be consolidated to the single step: if ΔT is medium, POWER is medium. However, steps 4 through 8 offer greater control capability.

Steps 1 through 3 are the initial steps for cool down; for example, at the startup process. Thus, here RT is not important but ΔV, the relationship of the applied voltage to the compressor-cooler to its allowable maximum value (determined by ambient temperature), is important. And the fact that this is a startup from ambient is indicated by all the rules 1, 2 and 3 including ΔT is "large". Here, the steps 1, 2 and 3 provide a gradual startup from medium power applied to medium large and then to large. The reason for the control of the maximum voltage is that overvoltage, since the compressor is constructed with a pair of piston actuators, will cause the pistons to travel and collide in both ends of the compressor housing which could cause permanent damage to the unit. Thus, this is the reason for the special cool down program. This occurs in a short period of time, approximately three minutes, after which the rules 4 through 15 provide the fine control for the system.

In addition to cool down, the system also provides additional protection for the focal plane of the associated infrared detector. If the cold tip temperature sensor is disconnected or malfunctions, the output of the controller will furnish maximum cooling power to the load as indicated by rule 3.

The membership functions illustrated in FIGS. 7A, 7B and 7C and FIG. 8 are illustrative of the advantages of the fuzzy logic control system in that it allows the designer to concentrate on how the process really operates; that is, to effectively utilize a pressure-volume diagram of a Stirling cooler-compressor. It is not necessary to develop a mathematical model which, as discussed above, for the Stirling cycle would be impractical. Rather, use of fuzzylogic with its set of rules, allows expert knowledge of the controller behavior to be easily integrated into the control strategy. This has been done by the use of the triangular input functions which are fuzzy sets for the three different inputs. And, as discussed, the output membership function, in effect singletons, may be modified to be asymmetrical triangles to fit the desired control characteristics.

EXAMPLE

The following example shown in FIG. 10 assumes a $\Delta T$ of 8° as indicated by the vertical line in FIG. 7B and an RT value of −0.9 as indicated by the vertical line in FIG. 7C. Since this is not a cool down mode, $\Delta V$ will not be used. Thus, referring to FIG. 7B with a $\Delta T$ of 8°, fuzzy outputs of 0.7 (MED) and 0.35 (LOW) are indicated. And, with respect to FIG. 7C and RT, the fuzzy outputs are 0.15 (zero) and 0.9 (less negative). Thus, the applicable rules, as indicated in FIG. 10, are 5 and 6 which are grouped together since they have a common $\Delta T$ of 0.7 and rules 9 and 10 since they have a common $\Delta T$ of 0.35.

In the case of rule 5, when $\Delta T$ is MED (0.7 and RT is less negative (0.9), 0.7 is selected. This is in accordance with standard fuzzy logic procedure where a minimum truth value is selected as described in step 54 of FIG. 6. This is as opposed to using 0.9 multiplied by 30%. And the same is done with the remaining rules 6, 9 and 10. Then, in accordance with fuzzy logic procedure, where more than one rule effects the same fuzzy output, that is, for example, 5 and 6 and also 9 and 10, use the larger as stated in step 54 of FIG. 6. Thus, between rules 5 and 6, the larger is 0.7×30% and rules 9 and 10, the larger is 0.35×10%. Thus, this concludes the rule evaluation.

In step 55, see FIG. 6, defuzzification is done with the center of maximum method; that is, referring to FIG. 8, the one level or maximums of the low, medium, etc., membership fuzzy sets are used. Thus, as indicated in FIG. 8, for a 10% and 30% power, respectively, the membership is respectively, 0.35 and 0.7. The final crisp value or the percent PWM of 23.33% (POWER) is provided by the equation shown in FIG. 10 which is a weighted average of the rule evaluation output. In general, from a broad standpoint this is a summation of fuzzy outputs times the maximum output membership function divided by a summation of fuzzy outputs. The foregoing is illustrated by examination of the equation of FIG. 10 where the two rule outputs are summed together and then divided by the sum of degrees of memberships; that is, 0.7 and 0.35.

Still referring to FIG. 8, if an asymmetrical output membership function, as indicated on the line 57, is desired, then rather than the singleton type calculation shown above, a graphical technique such as center of gravity or calculating the mean of the maximums from each rule would be used.

Figure 11:
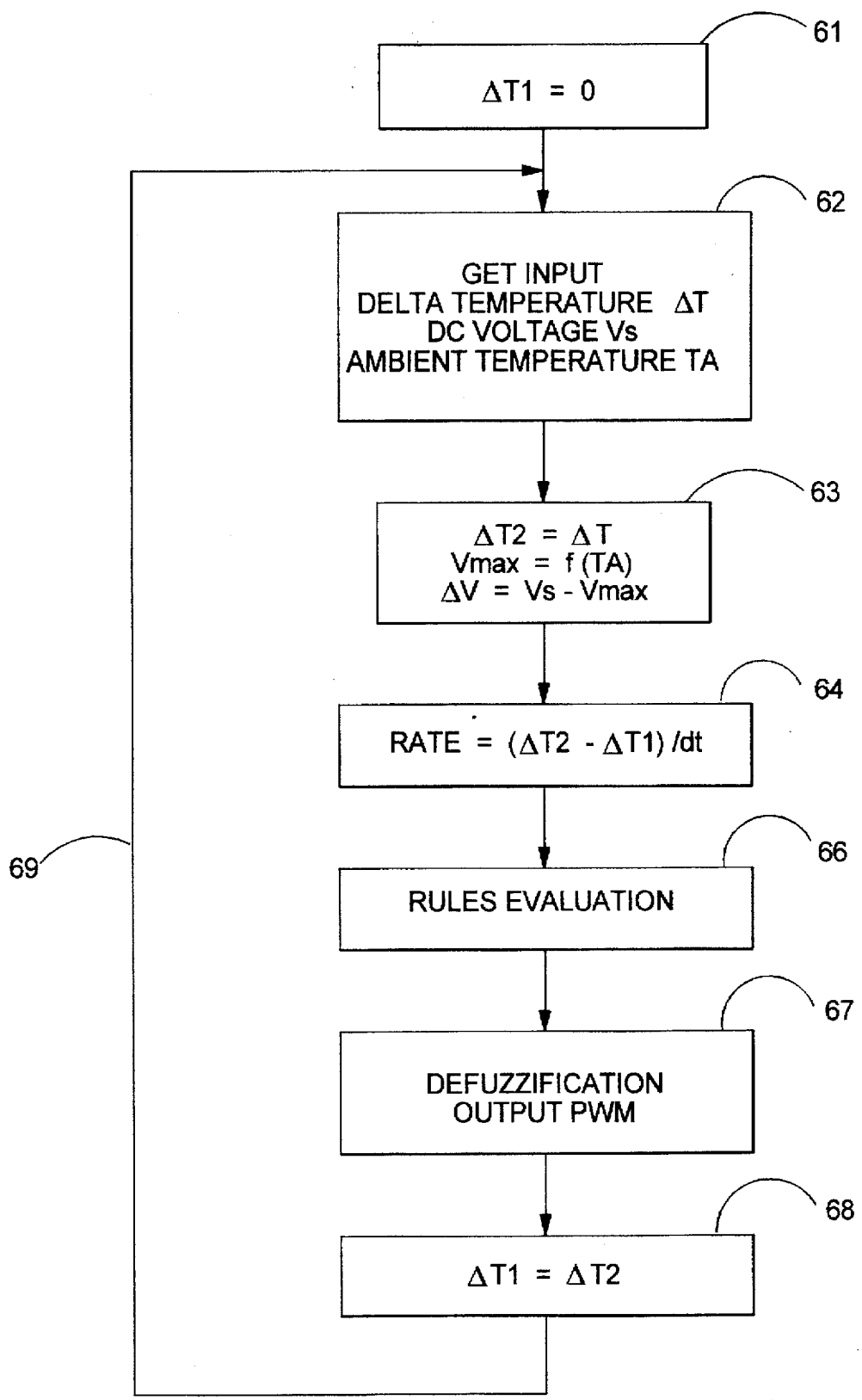
FIG. 11 is a flow chart illustrating in more detail the operation of FIG. 6.

FIG. 11 is a flow chart illustrating in more detail the flow chart of FIG. 6 wherein step 61 is $\Delta T1 = 0$. This is an initialization step. In step 62, new inputs are gotten including the ambient temperature, TA, the drive voltage, $V_s$, being supplied to the compressor and also $\Delta T$. In step 63, the temperature now $\Delta T2$ is related to $\Delta T$. $V_{max}$ is looked at in relation to ambient temperature and $\Delta V$ calculated for use if necessary. In step 64, the rate, RT, is calculated. In step 66, a rule evaluation is made, and defuzzification to produce the PWM output in step 67. Then, the new temperature difference is made the last temperature difference in step 68 and return is made on step 69.

The microcontroller software would store the functions of FIGS. 7A, 7B, 7C and FIG. 8 generally as end points and a slope. As is well known in the fuzzy logic field, this programming may be derived by using, for example, a tool such as Fuzzytech from inform Software Corporation. This allows a designer to enter the membership functions as discussed above and the rules of FIG. 9 graphically to then simulate the resulting controller and the tool automatically generates code for a target microcontroller.

Thus, a fuzzy logic controlled cryogenic system has been provided.

What is claimed is:

1. A cryogenic cooling system where a Stirling cycle cooler-compressor having opposed pistons is used for circulating a coolant fluid to a cold tip which is in proximity to the device for which cooling is desired, the cooler-compressor cooling the fluid to a predetermined temperature, the system comprising:

means for sensing ambient temperature;

means for sensing the actual temperature of said cold tip and the rate of change of said actual temperature;

controller means responsive to inputs of the difference between said predetermined and actual temperature, $\Delta T$, and said rate of change temperature, RT, for providing an output control signal to said cooler-compressor to control the cooling power of said compressor to substantially maintain said predetermined temperature including digital logic means for providing first and second input membership functions respectively related to said inputs, said membership functions being formed by mathematically fuzzy sets, said digital logic means also determining the degree of membership of said inputs to said respective input membership functions, said digital logic means also providing an output membership function, POWER, from which may be selected a said output signal, said controller means selecting only said rules relevant to said inputs having a degree of membership with said input membership functions and also using said output membership function for finding a weighted average which is said output control signal, said Stirling cycle cooler compressor having a maximum voltage to prevent damage to said cooler-compressor, said maximum voltage being dependent on said ambient temperature, said controller means limiting the voltage of said output control signal to less than or equal to said maximum voltage.

2. A cryogenic system as in claim 1 where the difference between said maximum voltage and said control signal is $\Delta V$, said digital logic means including a third input membership function including a plurality of mathematically fuzzy sets related to $\Delta V$.

3. A cryogenic system as in claim 2 where the relevant rules and use of said third membership function arise only during initial cool down of the fluid and emergency use where the cold tip sensor is opened or disconnected where the applicable rules provide for maximum cooling power.

4. A system as in claim 1 wherein said output membership function is sets of overlapping triangles and where depending on the heat transfer characteristic of the system including the Stirling cooler-compressor, said triangles may be asymmetrical.

5. A system as in claim 1 where said $\Delta T$ membership function includes zero, low, medium and large fuzzy sets.

6. A system as in claim 1 where said RT membership function includes negative, less negative, zero and positive fuzzy sets.

7. A system as in claim 1 where said predetermined temperature is adjustable.

8. A system as in claim 1 where said rules include the following and where said membership function, $\Delta T$, includes fuzzy sets of medium, low and zero, said membership function of RT includes negative, less negative, zero and positive, and said output membership function includes zero, low, medium, medium large and large:

a) if $\Delta T$ is medium and RT is negative, then POWER is medium large;

b) if $\Delta T$ is medium and RT is less negative, then POWER is medium;

c) if $\Delta T$ is medium and RT is zero, then POWER is medium;

d) if $\Delta T$ is medium and RT is positive, then POWER is medium large;

e) if $\Delta T$ is medium and RT is negative, then POWER is medium low;

f) if $\Delta T$ is low and RT is less negative, then POWER is low;

g) if $\Delta T$ is low and RT is zero, then POWER is low;

h) if $\Delta T$ is low and RT is positive, then POWER is medium low;

i) if $\Delta T$ is low and RT is negative, then POWER is low;

j) if $\Delta T$ is zero and RT is less negative, then POWER is zero;

k) if $\Delta T$ is zero and RT is zero, then POWER is zero; and l) if $\Delta T$ is zero and RT is positive, then POWER is medium low.

9. A system as in claim 2 where $\Delta T$ includes a fuzzy set of large, $\Delta V$ fuzzy sets of large, medium and small, and POWER fuzzy sets of medium, medium large and large where for cool down the following specific rules are applicable:

a) if $\Delta T$ is large and $\Delta V$ is large, then POWER is medium;

b) if $\Delta T$ is large and $\Delta V$ is medium, then POWER is medium large; and c) if $\Delta T$ is large and $\Delta V$ is small, then POWER is large.

10. A system as in claim 8 where rules a), b), c), d) may be consolidated into the single following rule:

if $\Delta T$ is medium, then POWER is medium.

11. A system as in claim 1 where said maximum voltage varies directly with said ambient temperature.

* * * * *